(12) United States Patent
Zhu

(10) Patent No.: US 8,862,177 B2
(45) Date of Patent: Oct. 14, 2014

(54) POWER CONTROL METHOD AND RADIO COMMUNICATION SYSTEM

(75) Inventor: Ling Zhu, Su Zhou (CN)

(73) Assignee: Sernet (Suzhou) Technologies Corporation, Jiangsu (CN)

( * ) Notice: Subject to any disclaimer, the term of this patent is extended or adjusted under 35 U.S.C. 154(b) by 172 days.

(21) Appl. No.: 13/603,321

(22) Filed: Sep. 4, 2012

(65) Prior Publication Data

US 2013/0065629 A1 Mar. 14, 2013

(30) Foreign Application Priority Data

Sep. 13, 2011 (CN) .......................... 2011 1 0269142

(51) Int. Cl.
*H04B 7/00* (2006.01)
*H04W 52/22* (2009.01)
*H04W 52/18* (2009.01)
*H04W 52/20* (2009.01)
*H04W 52/24* (2009.01)
*H04W 52/38* (2009.01)

(52) U.S. Cl.
CPC ............ *H04W 52/226* (2013.01); *H04W 52/18* (2013.01); *H04W 52/20* (2013.01); *H04W 52/24* (2013.01); *H04W 52/241* (2013.01); *H04W 52/386* (2013.01)
USPC ........... 455/522; 455/69; 455/135; 455/277.2

(58) Field of Classification Search
CPC ..... H04W 52/18; H04W 52/20; H04W 52/24; H04W 52/241

USPC ............... 455/522, 67.11, 68–70, 115.3, 126, 455/127.1, 127.2, 135, 226.3, 277.2, 296, 455/161.3
See application file for complete search history.

(56) References Cited

U.S. PATENT DOCUMENTS

| | | | |
|---|---|---|---|
| 2005/0041626 A1* | 2/2005 | Tiirola et al. | 370/335 |
| 2005/0107106 A1* | 5/2005 | Valkealahti et al. | 455/522 |
| 2005/0288053 A1* | 12/2005 | Gu | 455/522 |
| 2007/0021071 A1* | 1/2007 | Brouwer | 455/69 |
| 2008/0212468 A1* | 9/2008 | Wigard et al. | 370/230 |
| 2009/0116442 A1* | 5/2009 | Adjakple et al. | 370/329 |
| 2009/0154388 A1* | 6/2009 | Jalloul et al. | 370/312 |
| 2009/0264146 A1* | 10/2009 | Koo et al. | 455/522 |
| 2010/0081469 A1* | 4/2010 | Kazmi et al. | 455/522 |
| 2010/0222094 A1* | 9/2010 | Usuda et al. | 455/522 |
| 2010/0254292 A1* | 10/2010 | Kim et al. | 370/311 |

* cited by examiner

*Primary Examiner* — Dominic E Rego
(74) *Attorney, Agent, or Firm* — McClure, Qualey & Rodack, LLP

(57) ABSTRACT

A power control method applied to a radio network controller (RNC), a node B and a user equipment is provided. The method include steps of: determining a target block error rate; identify an initial signal-to-interference ratio (SIR) from a history look-up table (LUT) according to the target block error rate; estimating a measured block error rate between the RNC and the node B via the RNC; adjusting the initial SIR with reference to the measured block error rate and the target block error rate to generate an updated SIR; and controlling a signal transmission power of the user equipment with reference to the updated SIR via the node B.

12 Claims, 4 Drawing Sheets

POWER CONTROL METHOD AND RADIO COMMUNICATION SYSTEM

This application claims the benefit of People's Republic of China application Serial No. 201110269142.4, filed Sep. 13, 2011, the subject matter of which is incorporated herein by reference.

BACKGROUND OF THE INVENTION

1. Field of the Invention

The invention relates in general to a power control method and a radio communication system, and more particularly to a power control method and a radio communication system that perform power control with reference to history records.

2. Description of the Related Art

With advancements in technologies, the $3^{rd}$ Generation Partnership Project (3GPP) protocol is prevalent in applications of macrocells and femtocells to bring convenience to the daily life. In current techniques, power control mechanisms in 3GPP compliant communication systems can be categorized into open loop power control and closed loop power control. The closed loop power control is further divided into inner loop power control and outer loop power control.

In general, the inner loop power control compensates fast fading of a signal by adjusting transmission power of a user equipment or a base station, whereas the outer loop ensures that a communication system is offered with a certain quality having an acceptable transmission error rate by controlling a target value of a signal-to-interference ratio (SIR). As the 3GPP continues to prevail, it is a common goal of manufacturers to provide an even more efficient power control method.

SUMMARY OF THE INVENTION

The invention is directed to a power control method and a radio communication system. A radio network controller (RNC) includes a storage unit for storing a history look-up table (LUT). In the power control method and the radio communication system disclosed by the embodiments of the prevent invention, according to a determined target block error rate and an associated service type, an initial signal-to-interference ratio (SIR) is looked up from the history LUT, so as to perform related power control operations. Therefore, compared to a conventional power control method, the power control method and the radio communication system disclosed by the embodiments of the prevent invention are advantaged by being capable of more efficiently identifying a preferred updated SIR by setting the initial SIR with reference to the history LUT.

According to an aspect of the present invention, a power control method is provided. The method is applied to an RNC, a node B and a user equipment. The method includes steps of: determining a target block error rate; identifying an initial SIR from a history LUT according to the target block error rate and a service type; estimating a measured target block error rate between the RNC and the node B via the RNC; adjusting the initial SIR with reference to the measured block error rate and the target block error rate to generate an updated SIR; and controlling a signal transmission power of the user equipment with reference to the updated SIR via the node B.

According to another aspect of the present invention, a radio communication system is provided. The radio communication system includes a configuring unit, a storage unit, an LUT unit, an estimating unit and a comparing unit. The configuring unit determines a target block error rate in response to a user event. The storage unit stores a history LUT. The LUT unit looks up the history LUT to identify an initial SIR. The estimating unit estimates a measured block error rate between the RNC and the node. The comparing unit adjusts the initial SIR with reference to the measured target block error rate and the target block error rate to generate an updated SIR. The node B controls a signal transmission power of the user equipment with reference to the updated SIR.

In the power control method and the radio communication system of the prevent invention, the storage unit is disposed in the RNC for storing the history LUT. Further, in the power control method and the radio communication system of the prevent invention, the determined target block error rate is utilized for looking up the initial SIR from the history LUT, so as to perform related power control operations. Therefore, compared to a conventional power control method, the power control method and the radio communication system disclosed by the embodiments of the prevent invention are advantaged by being capable of more efficiently identifying a preferred updated SIR by setting the initial SIR with reference to the history LUT.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
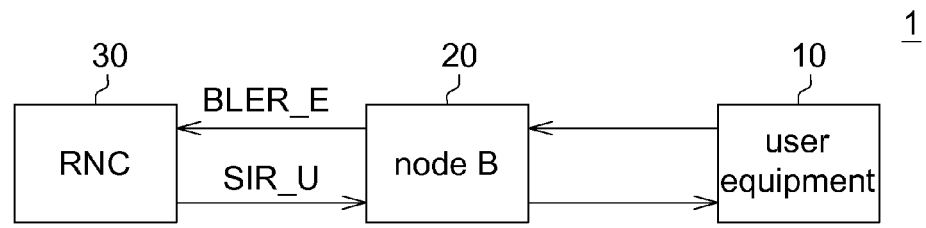
FIG. 1 is a block diagram of a radio communication system according to one embodiment of the present invention.

FIG. 1 shows a block diagram of a radio communication system according to one embodiment of the present invention. A radio communication system 1 according to this embodiment includes a user equipment 10, a node B 20 and a radio network controller (RNC) 30. For example, the radio communication system 1 is compliant to the $3^{rd}$ Generation Partnership Project (3GPP) protocol, and the user equipment 10 is a handheld device such as a mobile phone capable of 3GPP communication operations.

In one embodiment, the node B 20 and the RNC 3 may be implemented by a macrocell to provide services to a user equipment located in a larger area. In another embodiment, the node B 20 and the RNC 30 may be implemented by a femtocell to provide services to a user equipment located in a smaller area. Wherein, the node 20 B may be underlayer protocols of the femtocell and the RNC 30 may be a main control mechanism of the femtocell.

Figure 2:
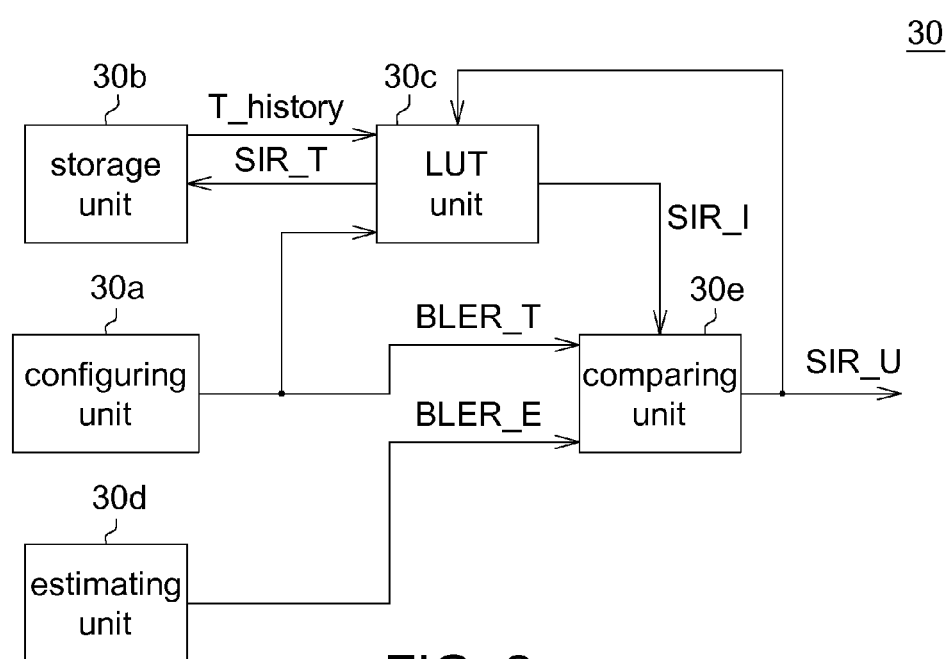
FIG. 2 is a detailed block diagram of a radio network controller (RNC) 30 in FIG. 1.

FIG. 2 shows a detailed block diagram of the RNC 30 in FIG. 1. The RNC 30 includes a configuring unit 30a, a storage unit 30b, a look-up table (LUT) unit 30c, an estimating unit 30d and a comparing unit 30e. In response to a user event, the configuring unit 30a determines a target block error rate BLER_T, and provides the target block error rate BLER_T to the LUT unit 30c and the comparing unit 30e. For example, the configuring unit 30a is an operation, administration and maintenance (OAM) unit, through which a user controls the RNC 30 to correspondingly set the target block error rate BLER_T.

The storage unit 30b stores a history LUT T_history. The history LUT T_history includes multiple data structures, which respectively correspond to different types of services supported by the radio communication system 1. Taking an application of a femtocell for example, the services include circuit-switched services and packet-switched services. For example, the circuit-switched services include audio telephone services and video telephone services; the packet-switched services include PS64K, PS128K and PS384K services. For example, the data structures in the history LUT T_history have similar formats. In the following description, the data structure of circuit-switched services shall be used an example for explaining the history LUT T_history.

Figure 3:
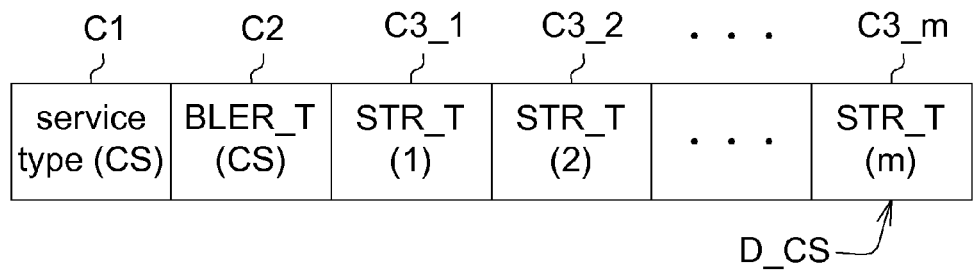
FIG. 3 is a schematic diagram of a history LUT T_history.

FIG. 3 shows a schematic diagram of a history LUT T_history. A data structure D_CS corresponding to the circuit-switched services include data columns C1, C2, C3_1, C3_2, ..., and C3_m, where m is a natural number. The data columns C1 and C2 respectively record service types corresponding to the data structure D_CS and the corresponding target block error rate BLER_T. The data columns C3_1 to C3_m respectively record n history initial reference signal-to-interference ratios (SIR) SIR_T(1), SIR_T(2), ..., and SIR_T(m).

The LUT unit 30c receives the target block error rate BLER_T provided by the configuring unit 30a, and looks up a history LUT T_history to identify an initial SIR. For example, according to the service type information of the circuit-switched services and the target block error rate BLER_T, the LUT unit 30c identifies the corresponding data structure D_SC and the m history initial reference SIRs SIR_T(1) to SIR_T(m) from the history LUT T_history. The LUT unit 30c further identifies an average value of the history initial reference SIRs SIR_T(1) to SIR_T(m) to correspondingly determine the initial SIR SIR_I. In another example, the LUT unit 30c identifies a maximum value and a minimum value of the history initial reference SIRs SIR_T(1) to SIR_T(m), and further identifies an average value of the maximum value and the minimum value to correspondingly determine the initial SIR SIR_I.

The estimating unit 30d estimates a measured target block error rate BLER_E between the RNC 30 and the node B20.

The comparing unit 30e receives the measured target block error rate BLER_E estimated by the estimating unit 30d and the target block error rate BLER_T determined by the configuring unit 30a, and judges whether the measured block error rate BLER_E matches the target block error rate BLER_T. When the measure block error rate BLER_E does not match the target block error rate BLER_T, the comparing unit 30e adjusts the initial SIR SIR_I to generate an updated SIR SIR_U.

After the updated SIR SIR_U is provided, the comparing unit 30e provides the updated SIR SIR_U to the node B 20. The node B 20 performs an inner loop power control operation according to the updated SIR SIR_U to control the signal transmission power of the user equipment 10.

After the node B 20 controls the signal transmission power of the user equipment 10, the RNC 30 and the node B 20 iterates operations of estimating the measured target block error rate BLER_E, judging whether the measured target block error rate BLER_E matches the target block error rate BLER_T and generating the updated SIR SIR_U, so as to perform a next power control loop operation. Accordingly, through the outer power control performed between RNC 30 and the node B 20 and the inner power control performed between the node B 20 and the user equipment 10, the power control loop operation on the radio communication system 1 is achieved.

Figure 4:
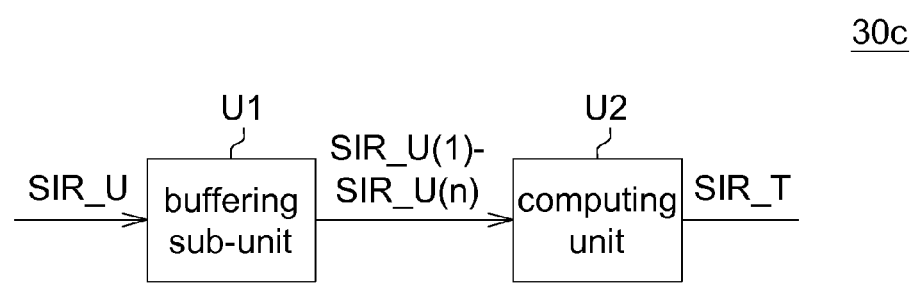
FIG. 4 is a detailed block diagram of an LUT unit 30c in FIG. 2.

FIG. 4 shows a detailed block diagram of the LUT unit 30c in FIG. 3. For example, the LUT unit 30c further receives the updated SIR SIR_U to establish the history LUT T_history. Further, the LUT unit 30c includes a buffering sub-unit U1 and a computing sub-unit U2.

The buffering sub-unit U1 temporarily stores the updated SIR SIR_U generated in the power control loop operations to temporarily store multiple updated SIRs corresponding to the target block error rate BLER_T. For example, in one circuit-switched service operation, the radio communication system 1 performs n power control loop operations to correspondingly obtain n updated SIRs, and temporarily stores the n updated SIRs as n updated temporary SIR SIR_U(1), SIR_U(2), ..., and SIR_U(n), where n is a natural number greater than 1.

The computing sub-unit U2 identifies a history initial reference SIR according to the updated temporary SIRs SIR_U(1) to and SIR_U(n), and stores the history initial reference SIR in the data column of the corresponding data structure. For example, this service operation is a first circuit-switched service operation performed by the radio communication system 1, and the computing sub-unit U2 accordingly fills the history initial reference SIR into the data column C3_1 of the data structure D_SC.

Thus, each time a circuit-switched service is executed, the LUT unit 30c generates a history initial reference SIR according to multiple updated temporary SIRs SIR_U(1) to SIR_U(n) generated from multiple power control loop operations. After m circuit-switched service operations, the LUT unit 30c then correspondingly fills the m history initial reference SIRs into the columns C3_1 to C3_m in the data structure D_CS.

Figure 5:
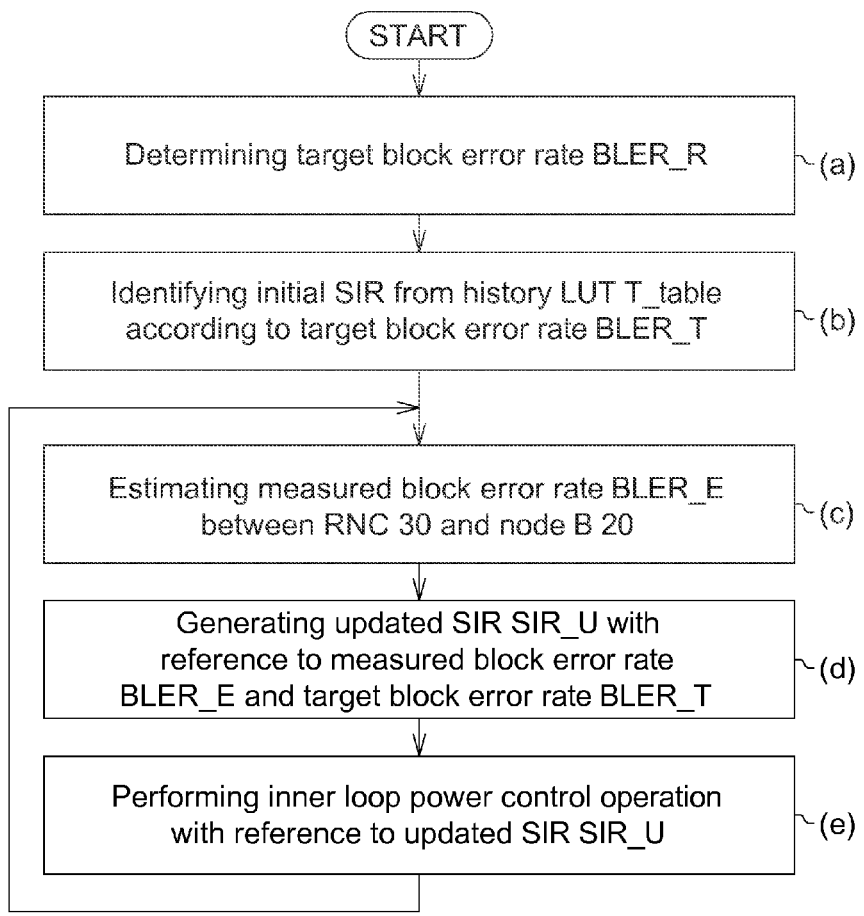
FIG. 5 is a flowchart of a power control method according to one embodiment of the present invention.

FIG. 5 shows a flowchart of a power control method according to one embodiment of the present invention. The method includes the following steps. In Step (a), the configuring unit 30a determines a target block error rate BLER_T in response to a user event. In Step (b), the LUT unit 30c looks up a history LUT T_history according to the target block error rate BLER_T to identify an initial SIR SIR_I.

In Step (c), the estimating unit 30d estimates a measured target block error rate BLER_E between the RNC 30 and the node B 20. In Step (d), the comparing unit 30e adjusts the initial SIR with reference to the measured target block error rate BLER_E and the target block error rate BLER_T to generate an updated SIR SIR_U. In Step (e), the node B 20 controls the signal transmission power of the user equipment 10 with reference to the updated SIR SIR_U to perform a corresponding inner loop power control operation.

After Step (e), the power control method according to this embodiment further iterates Steps (c) to (e) to generate a next updated SIR SIR_U and to accordingly perform a next power control loop operation.

Figure 6:
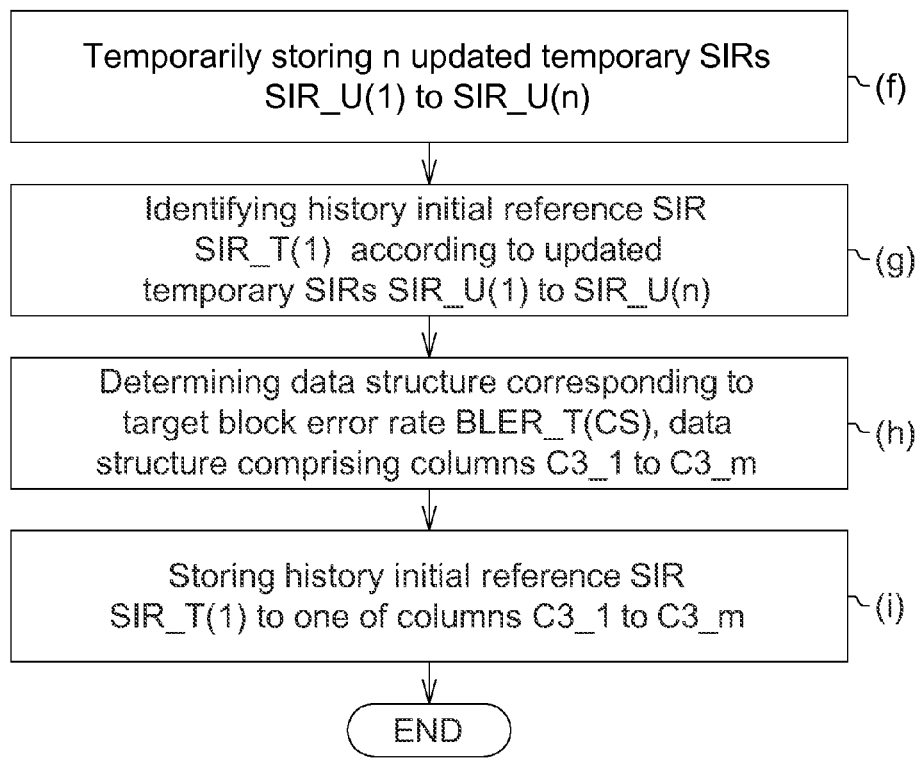
FIG. 6 is a partial flowchart of a power control method according to one embodiment of the present invention.

FIG. 6 shows a partial flowchart of a power control method according to one embodiment of the present invention. After exiting the Steps (c) to (e), the power control method according to this embodiment further includes Steps (f) to (i). In Step (f), the buffering sub-unit U1 temporarily stores an updated SIR obtained from each power control loop operation as an updated temporary SIR, so as to obtain n updated temporary SIRs SIR_U(1) to SIR_U(n) after n power control loop operations.

In Step (g), according to the updated temporary SIRs SIR_U(1) to SIR_U(n), the computing sub-unit U2 identifies a history initial reference SIR, e.g., a history initial reference SIR SIR_T(1). In Step (h), from the history LUT, the computing sub-unit U2 determines that the data structure (e.g., the data structure D_CS) of the history initial reference SIR corresponds to the target block error rate BLER_T (for circuit-switched services), wherein the data structure includes multiple columns C3_1 to C3_m. In Step (i), the computing sub-unit U2 stores the history initial reference SIR SIR_T(1) into one of the columns C3_1 to C3_m.

In Step (i), the power control method of this embodiment further iterates Steps (a) to (e) and Steps (f) to (i), so as to correspond to the target block error rate BLER_T and to store multiple history initial reference SIRs SIR_T(1) to SIR_T(m) into the history initial SIR data structure D_CS.

In the power control method and the radio communication system disclosed by the embodiments of the prevent invention, a storage unit is disposed in an RNC for storing a history LUT. Further, in the power control method and the radio communication system disclosed by the embodiments of the prevent invention, the determined target block error rate is utilized for looking up the initial SIR from the history LUT, so as to perform related power control operations. Therefore, compared to a conventional power control method, the power control method and the radio communication system disclosed by the embodiments of the prevent invention are advantaged by being capable of more efficiently identifying a preferred updated SIR by setting the initial SIR with reference to the history LUT.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power control method, applied to a radio network controller (RNC) and a node B, the method comprising:
    a) determining a target block error rate;
    b) identifying an initial signal-to-interference ratio (SIR) from a history look-up table (LUT) according to the target block error rate;
    c) estimating a measured target block error rate between the RNC and the node B via the RNC;
    d) adjusting the initial SIR with reference to the measure block error rate and the target block error rate to generate an updated SIR; and
    e) controlling a signal transmission power of a user equipment with reference to the updated SIR via the node B.

2. The method according to claim 1, after step (e), the method further iterating steps (c) to (e) to identify a next updated SIR and to perform a next power control loop operation.

3. The method according to claim 1, further comprising:
    f) temporarily storing the updated SIRs generated by the power control loop operations to correspond to a plurality of updated temporary SIRs of the target block error rate.

4. The method according to claim 3, further comprising:
    g) identifying a history initial reference SIR according to the updated SIR;
    h) determining from the history LUT a history initial SIR data structure corresponding to the target block error rate, the history initial SIR data structure comprising a plurality of columns; and
    i) storing the history initial reference SIR to one of the columns of the history initial SIR data structure.

5. The method according to claim 4, after step (i), further iterating steps (a) to (e) and steps (f) to (i) to correspond to the target block error rate and to store a plurality of the history initial reference SIRs to the history initial SIR data structure.

6. The method according to claim 5, wherein step (b) comprises:
    b1) identifying the initial SIR according to the history initial reference SIR in the column.

7. A radio communication system, comprising:
    a node B; and
    an RNC, comprising:
        a configuring unit, for determining a target block error rate in response to a user event;
        a storage unit, for storing a history LUT;
        an LUT unit, identifying an initial SIR from the history LUT according to the target block error rate;
        an estimating unit, for estimating a measured target block error rate between the RNC and the node B via the RNC; and
        a comparing unit, for comparing the measure block error rate and the target block error rate to adjust the initial SIR to generate an updated SIR;
    wherein, the node B controls a signal transmission power of a user equipment with reference to the updated SIR.

8. The system according to claim 7, wherein after the node B controls the signal transmission power of the user equipment, the RNC and the node B iterate operations of estimating the measured block error rate, comparing the measure block error rate and the target block error and generating the updated SIR to perform a next power control loop operation.

9. The system according to claim 8, wherein the LUT unit comprises:
    a buffering sub-unit, for temporarily storing the updated SIRs generated by the power control loop operations to correspond to a plurality of updated temporary SIRs of the target block error rate.

10. The system according to claim 9, wherein the LUT unit further comprises:
    a computing sub-unit, for identifying a history initial reference SIR according to the updated SIR;
    wherein, the history LUT comprises a history initial SIR data structure corresponding to the target block error rate, and the history initial SIR data structure comprises a plurality of columns; and the computing sub-unit stores the history initial reference SIR to one of the columns.

11. The system according to claim 10, wherein after the computing sub-unit stores the history initial reference SIR to one of the columns, units of the system further iterate corresponding operations to correspond to the target block error rate and to store a plurality of the history initial reference SIRs to the history initial SIR data structure.

12. The system according to claim 11, wherein the computer sub-unit identifies the initial SIR according to the history initial reference SIR stored in the column.

* * * * *